United States Patent Office 3,663,546
Patented May 16, 1972

3,663,546
PROCESS FOR THE PREPARATION OF
PYRIDAZONE DERIVATIVES
Rupert Schönbeck, Leonding, near Linz (Danube), and Engelbert Kloimstein, Eferding, Austria, assignors to Osterreichische Stickstoffwerke Aktiengesellschaft, Linz (Danube), Austria
No Drawing. Filed Jan. 27, 1970, Ser. No. 6,312
Claims priority, application Austria, Feb. 6, 1969,
A 1,181/69
Int. Cl. C07d 51/04
U.S. Cl. 260—250 A
8 Claims

ABSTRACT OF THE DISCLOSURE

Pyridazone derivatives of the formula

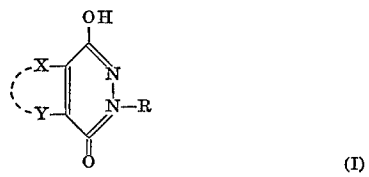

in which X and Y each are hydrogen, chloride; bromine and lower alkyl or X and Y together are the group

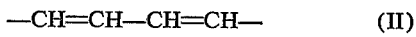

and R is hydrogen or lower alkyl, optionally substituted by phenyl or the cyano group were prepared by reacting maleic acid or anhydride, or its substitution products with the acid solution of a hydrazine $H_2N$—NHR, which was prepared by treating crude solutions containing said hydrazine as the base at the boil with aliphatic ketones, which at normal temperature are liquid and water-immiscible, separating the organic layer and decomposing this layer with an aqueous mineral acid, optionally in presence of the maleic acid or anhydride or its substitution products respectively.

---

This invention relates to a process for the preparation of pyridazone derivatives.

It is known that cyclic hyrazides of unsaturated dicarboxylic acids, which possess the structure of 3-hydroxy-6-pyridazones and which may be N-substituted, may be manufactured by reaction of the corresponding dicarboxylic acids with hydrazine or hydrazine salt solutions. Since such compounds, for example maleic acid hydrazine, are of increased interest as intermediate products for the manufacture of plant protection agents or pharmaceutically active compounds, but the indicated possible synthesis is unsatisfactory in economic respects, particularly because of the high price of hydrazine, there is increasing interest in finding a more economical method of manufacturing such compounds.

A cheap source of hydrazine is available in the crude reaction solutions which result from the industrial manufacture of hydrazine, for example in the synthesis of hydrazine from ammonia or the reaction of urea and hypochlorite, from which solutions the hydrazine must be isolated in a pure form. These solutions are, however, so dilute that complete reaction with the dicarboxylic acid can no longer take place, as has been shown by our own experiments. However, the high salt content of these solutions stands in the way of a prior concentration.

Previously it has been proposed to expel the hydrazine from such dilute saline hydrazine solutions as a reaction product with acetone. This reaction product, a volatile ketonazine, is obtained by addition of acetone to such aqueous solutions. If the vapours resulting during the expulsion are passed into aqueous mineral acid solutions of maleic acid, maleic acid hydrazide is obtained in good yield. This good yield is however only relative to maleic acid but not relative to the hydrazine originally present in the solution, since only a part of the hydrazine can in this way be utilised for the reaction. Apart from this, the recovery of the acetone by distillation is rather expensive, since relatively large quantities of water distil at the same time, which result in a high energy consumption and furthermore subsequently have to be removed from the filtrate.

It has now been found that hydrazides of unsaturated dicarboxylic acids can also be manufactured, starting from industrially produced dilute hydrazine solutions, in good yield not only relative to the dicarboxylic acid but also relative to the hydrazine contained in the solution, if the reaction is carried out with an acid hydrazine salt solution which is obtained by treating the dilute industrially produced hydrazne solution with higher aliphatic, water-immiscible ketones, separating off the organic layer thereby produced, and decomposing the reaction product of hydrazine contained in this layer, with the ketone, with mineral acid whilst simultaneously distilling off the liberated ketone. Since the ketone is a water-immiscible ketone, the ketone which is distilled off can immediately be again employed for further reaction with the hydrazine solution. This manufacturing process is not only applicable to the hydrazine salt solutions themselves but also to equivalent solutions of hydrazines which are substituted at one of the two nitrogen atoms.

Thus, according to the present invention there is provided a process for the preparation of a pyridazone derivative having the general formula:

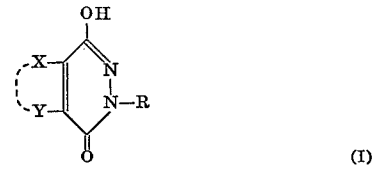

in which X and Y may be the same or different, and each is a hydrogen atom, a halogen atom or a lower alkyl group, or when taken together represent the group:

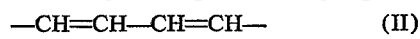

and in which R is a hydrogen atom or a lower alkyl group, optionally substituted by a phenyl group or a cyano group, which process comprises reacting a dicarboxylic acid having the general formula:

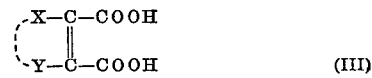

in which X and Y are as defined above, or the anhydride thereof, with an aqueous solution of mineral acid salts of hydrazine or of a substituted hydrazine having the formula:

in which R is as defined above, which has been obtained from the crude, dilute reaction solutions resulting from the manufacture of the hydrazines of Formula IV and containing these hydrazines as the base, by treatment of these solutions with aliphatic ketones which at normal temperature are liquid and water-immiscible, separating off the organic layer containing the reaction product between the ketone and the hydrazine of Formula IV, and decomposing this layer with an aqueous mineral acid whilst continuously distilling off the ketone liberated at the same time. The hydrazides of the dicarboxylic acids of Formula I crystallise out from the acid reaction solution and can be separated off by filtration or centrifugation.

The mother liquors thereby produced have an acid content which suffices for the decomposition of further ketone addition products of the hydrazine of Formula IV. It is therefore advantageous to recycle the mother liquors for this purpose.

According to a particularly preferred embodiment of the process according to the invention, the acid solution of the salt of the hydrazine of Formula IV is not manufactured in a separate process stage but is formed in situ directly before its reaction, by introducing the organic layer, containing the reaction product of the ketone with the hydrazine of Formula IV, into a mineral acid solution of the dicarboxylic acid of Formula III or of its anhydride. The ketone which is thereupon liberated is continuously distilled off from the reaction vessel. The mineral acid solution of the dicarboxylic acid III or of its anhydride can advantageously be a solution which is obtained by dissolving these compound in the mother liquor of a prior reaction.

The nature of the crude reaction solution from the manufacture of the hydrazine of Formula IV, which is subjected to the treatment with the ketone, has no essential influence on the success of the process. It is possible to employ both a strongly saline hydrazine solution and a strongly alkaline hydrazine solution, as is for example produced on reaction of hypochlorite solution with urea. It is only essential that the hydrazine of Formula IV should be present in it as the base. Again, the only decisive factor for the ketone employed is that it is still liquid at normal temperature, in order to achieve thorough mixing with the aqueous phase, and that it is immiscible with water, in order to ensure an economically tolerable recovery or recycling of these ketones. Methyl isobutyl ketone, methyl ethyl ketone and methyl isopropyl ketone have proved particularly successful.

The treatment of the crude solution containing the hydrazines of Formula IV, with the ketones, can be carried out either discontinuously or continuously in countercurrent.

If a very good utilisation of the crude hydrazine solution is desired, it is advisable to carry out the reaction with the water-immiscible ketone several times in succession using fresh ketone in each case, either continuously or discontinuously. The solution produced on a second or subsequent reaction, which now only shows a low content of bonded hydrazine, is appropriately employed in a further reaction with fresh hydrazine solution.

The following examples illustrate the invention and the manner in which it is performed.

EXAMPLE 1

9 l. of an 0.645 molar hydrazine solution which has been obtained by reaction of 500 g. of urea with 488 g. of NaOCl and 800 g. of NaOH in aqueous solution, is mixed with 1,280 g. of methyl isobutyl ketone, the mixture is heated to the boil over the course of one hour whilst stirring and boiled for 15 minutes, and the organic phase is separated off at 80° C. 1,410 g. of product containing 12% by weight of hydrazine in the bonded form is produced.

800 g. of this reaction product is mixed with 650 g. of 20% strength hydrochloric acid, the methyl isobutyl ketone liberated is distilled off azeotropically, and the hydrazine hydrochloride solution obtained, which contains 3 mols of hydrazine, is mixed with 240 g. of maleic anhydride and boiled for 30 minutes; a further 68 g. of maleic anhydride is then added and the mixture is left to continue reacting for one hour at the boil.

The mixture is then cooled to 20° C. and diluted with 500 ml. of water, and the crystals are filtered off, washed with water and dried. The yield is 305 g. of maleic hydrazide, representing 91% of theory relative to the hydrazine employed.

EXAMPLE 2

4.5 l. of the hydrazine solution already treated with methyl isobutyl ketone in Example 1 and still containing 0.077 mol of hydrazine/l., is stirred for one hour at 85° C. with 430 g. of fresh methyl isobutyl ketone, and the organic layer is separated off.

4.5 l. of an 0.645 molar hydrazine solution which was obtained from an experiment described in Example 1, is mixed with the organic layer previously obtained from the post-extraction, the mixture is brought to the boil whilst stirring and then allowed to complete reacting for a further 15 minutes, and the organic layers are separated off. The aqueous solution is again treated with 430 g. of fresh methyl isobutyl ketone and the resulting organic solution is reacted with fresh 0.64 molar hydrazine solution.

A series of such experiments resulted in a reaction product of hydrazine and methyl isobutyl ketone which contained 18.5% by weight of hydrazine in a bonded form. As a result of this procedure, the hydrazine could be removed to the extent of up to 99.5% from the dilute aqueous hydrazine solution.

Given an appropriate arrangement of the apparatus, the hydrazine can be separated off continuously in countercurrent.

308 g. of maleic anhydride is dissolved in 1.2. l. of water, 150 g. of concentrated $H_2SO_4$ is added and 520 g. of the reaction product of hydrazine with methyl isobutyl ketone, containing 18.5% by weight of bonded hydrazine, is added over the course of 2 hours whilst boiling, with the methyl isobutyl ketone at the same time being continuously distilled off azeotropically with water. Thereafter the mixture is boiled for a further 30 minutes under a reflux condenser, and the maleic hydrazide is then centrifuged off at 50° C. and rinsed with 500 ml. of water. The wash water is withdrawn separately and discarded. The yield is 270 g. of maleic hydrazide, corresponding to 80.5% of theory.

EXAMPLE 3

308 g. of maleic anhydride is dissolved in 1,320 ml. of mother liquor after centrifuging off the maleic hydrazide in Example 2. 520 g. of the reaction product of hydrazine and methyl isobutyl ketone obtained according to Example 2, containing 18.5% of bonded hydrazine, is introduced into this solution over the course of 2 hours and the procedure was carried out as described in Example 2. The yield is 310 g. of maleic hydrazide, representing 92.5% of theory.

EXAMPLE 4

308 g. of maleic anhydride is dissolved in 1,350 ml. of mother liquor which is obtained according to Example 3. After separating off the maleic hydrazide, 520 g. of the 18.5% strength hydrazine solution in methyl isobutyl ketone is added, and the ketone which was again formed was distilled off. Thereafter the mixture was boiled for a further hour under a reflux condenser and worked up as in the preceding examples. The yield is 310 g. of maleic hydrazide, representing 92.5% of theory.

EXAMPLE 5

530 g. of chloromaleic anhydride is mixed with 2 l. of water, 196 g. of concentrated $H_2SO_4$ and 682 g. of the reaction product of methyl isobutyl ketone and hydrazine described in Example 2, containing 18.5% by weight of hydrazine in the bonded form. The mixture is heated to the boil and the methyl isobutyl ketone is distilled off azeotropically over the course of one hour. Thereafter the mixture is cooled to 45° C. and the crystals are filtered off, washed with 1 l. of water and dried. 490 g. of chloromaleic hydrazide is thus obtained, representing 86% of theory.

In the same manner bromomaleic hydrazide can be obtained from bromomaleic anhydride.

EXAMPLE 6

668 g. of dichloromaleic anhydride, 2 l. of water, 196 g. of concentrated H₂SO₄ and 682 g. of the reaction product of methyl isobutyl ketone and hydrazine described in Example 2, containing 18.5% of bonded hydrazine, are mixed and heated to the boil, and the methyl isobutyl ketone is distilled off azeotropically over the course of one hour. The pasty mixture is then cooled to 45° C. and the crystals are filtered off, washed with 1 l. of water and dried. 650 g. of dichloromaleic hydrazide are thus obtained, representing 90.8% of theory.

In the same manner dibromomaleic hydrazide can be obtained from dibromo maleic anhydride.

EXAMPLE 7

60 g. of citraconic acid, 250 ml. of water, 45 ml. of concentrated HCl and 82 g. of a reaction product of methyl isobutyl ketone and hydrazine, containing 18.5% of bonded hydrazine according to Example 2, are mixed and the methyl isobutyl ketone is distilled off azeotropically over the course of one hour. The mixture is then cooled to 45° C. and the crystals are filtered off, washed with 200 ml. of water and dried. The yield is 53 g. of citraconic hydrazide, representing 91% of theory.

EXAMPLE 8

592 g. of phthalic anhydride, 2 l. of water, 196 g. of concentrated H₂SO₄ and 682 g. of a reaction product of methyl isobutyl ketone and hydrazine containing 18.5% of bonded hydrazine according to Example 2, are mixed and heated to the boil, and the methyl isobutyl ketone is distilled off azeotropically. The mixture is then boiled for a further 3 hours under a reflux condenser and cooled to 45° C., and the crystals are filtered off, rinsed with 1 l. of water and dried. The yield is 598 g. of phthalic hydrazide, representing 91% of theory.

EXAMPLE 9

1 l. of an 0.97 molar hydrazine solution together with 145 g. of methyl ethyl ketone are kept at the boil whilst stirring, the organic phase is then separated off, and the aqueous solution, which still contains 20% of the hydrazine originally present, is stirred with 145 g. of methyl ethyl ketone for 30 minutes at the boil. The layers are then again separated. In total, 280 g. of organic reaction product containing 10.8% of bonded hydrazine is obtained. This solution is added to a mixture of 100 g. of maleic anhydride, 400 ml. of water and 40 g. of concentrated H₂SO₄ and heated, and the methyl ethyl ketone is distilled off azeotropically. Thereafter the mixture is boiled for a further hour under a reflux condenser and cooled to 45° C., and the crystals are filtered off, washed with 200 ml. of water and dried. The yield is 90 g. of maleic hydrazide, representing 85% of theory.

EXAMPLE 10

940 g. of an 8% strength β-cyanethyl hydrazine solution which was manufactured by reaction of a 1-molar hydrazine solution with an equimolar amount of acrylonitrile at room temperature, is warmed for 30 minutes at 92° C. with 100 g. of methyl isobutyl ketone and the organic phase is then separated off. The aqueous solution, which still contains 18% of the β-cyanethyl hydrazine originally present, is treated with a further 100 g. of methyl isobutyl ketone at 88° C. A total of 97% of the β-cyanethyl hydrazine could thereby be extracted from the aqueous solution. 213 g. of the mixture obtained by combining the two fractions, containing 68 g. of β-cyanethyl hydrazine in the bonded form, is added to a solution of 78 g. of maleic anhydride and 40 g. of concentrated H₂SO₄ in 500 ml. of water. The mixture is heated to the boil, and the methyl isobutyl ketone is distilled off azeotropically. Thereafter the mixture is cooled to 25° C. and the crystals are filtered off, washed with 200 ml. of water and dried. The yield is 106 g. of 1-β-cyanethyl-3-hydroxy-pyridazone-(6), representing 80% of theory.

EXAMPLE 11

500 ml. of a 10% nitrogen benzyl hydrazine solution is stirred for 1 hour at the boil with 46 g. of methyl isobutyl ketone and the layers were separated. 93% of the benzyl hydrazine is found in the organic layer as a reaction product with methyl isobutyl ketone. A further treatment of the aqueous layer with 46 g. of methyl isobuytl ketone results in complete separation of the benzyl hydrazine from the aqueous solution. 150 g. of a solution obtained after combining the two fractions, which contained 61 g. of benzyl hydrazine in the bonded form, is added to a solution of 49 g. of maleic anhydride, 30 ml. of concentrated HCl and 400 ml. of water and heated to the boil, and the methyl isobutyl ketone is distilled off azeotropically. Thereafter the mixture is heated for a further hour to the boil and then cooled to 20° C., and the crystals are filtered off, washed with 200 ml. of water and dried. The yield is 80 g. of 1 benzyl-3-hydroxypyridazone-(6), representing 80% of theory.

In the same manner 1-butyl-3-hydroxypyridazone-(6) can be obtained by reaction of maleic anhydride with the reaction product of butyl hydrazin and methyl isobutyl ketone.

What is claimed is:

1. A process for the preparation of pyridazone derivatives of the formula,

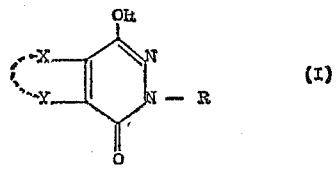

in which X and Y each are selected from the group consisting of hydrogen, chlorine, bromine and lower alkyl, X and Y being together the group,

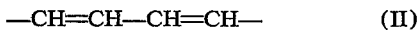

—CH=CH—CH=CH—    (II)

and R is selected from the group consisting of hydrogen, lower alkyl, lower alkyl substituted by phenyl and lower alkyl substituted by the cyano-group, which process comprises reacting a compound selected from the group consisting of a dicarboxylic acid of the formula,

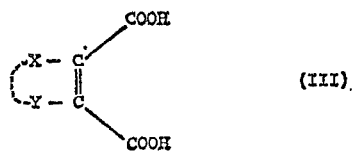

X and Y being as defined above, and the anhydrides thereof, with an aqueous solution of mineral acid salts of a hydrazone derivative of the formula,

H₂N—NHR    (IV)

in which R is as defined above, said aqueous solution being prepared by boiling the reaction product of:
  (1) the crude dilute reaction solution containing the hydrazine derivative of Formula IV, said solution being produced by the reaction of a hypochlorite and urea with
  (2) aliphatic ketones having a maximum of 7 carbon atoms which at normal temperature are liquid and water immiscible,
separating off the organic layer containing the reaction product between the ketone and the hydrazine of Formula IV and decomposing in the heat this layer with an aqueous mineral acid whilst continuously distilling off the ketone liberated at the same time.

2. A process as claimed in claim 1, in which the mother liquor after separating off the resulting pyridazone derivative of Formula I is used as aqueous mineral acid to decompose the organic layer of a further reaction according to claim 1.

3. A process as claimed in claim 1, in which the aliphatic ketone is selected from the group consisting of methyl isobutyl ketone, methyl ethyl ketone and methyl isopropyl ketone.

4. A process for the preparation of pyridazone derivatives of the formula,

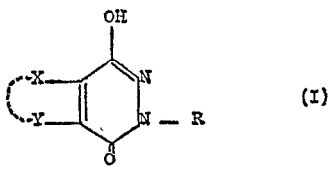 (I)

in which X and Y each are selected from the group consisting of hydrogen, chlorine, bromine and lower alkyl, X and Y being together the group $$-CH=CH-CH=CH-  \quad (II)$$

and R is selected from the group consisting of hydrogen, lower alkyl, lower alkyl substituted by phenyl and lower alkyl, substituted by the cyano group, which process comprises boiling the reaction product of:

(1) crude dilute reaction solutions containing the hydrazines of the formula:

$$H_2N-NHR  \quad (IV)$$

R being as defined above, said solution being produced by the reaction of a hypochlorite and urea with (2) aliphatic ketones having a maximum of 7 carbon atoms, which at normal temperature are liquid and water immiscible, separating off the organic layer of the reaction mixture, containing the reaction product between the ketone and the hydrazine of Formula IV, adding such organic layer to an aqueous mineral acid solution of a compound, selected from the group consisting of a dicarboxylic acid of the formula

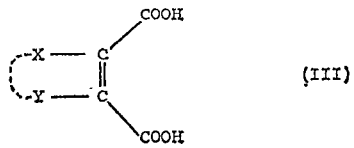 (III)

X and Y being as defined above, and the anhydride thereof and boiling the resulting mixture, in order to distil off the ketone, being liberated continuously.

5. A process as claimed in claim 4, in which the acid mother liquor of a previous preparation of the pyridazone derivatives of Formula I is used for dissolving the dicarboxylic acid of Formula III or its anhydride.

6. A process as claimed in claim 4, in which the aliphatic ketone is selected from the group consisting of methyl isobutyl ketone, methyl ethyl ketone and methyl isopropyl ketone.

7. A process according to claim 1 wherein the hypochlorite is sodium hypochlorite.

8. A process according to claim 4 wherein the hypochlorite is sodium hypochlorite.

References Cited
UNITED STATES PATENTS
3,539,567   11/1970   Doebel et al. _____ 260—250 A NICHOLAS S. RIZZO, Primary Examiner